May 17, 1938.     W. N. GLAB     2,117,473
CAP AND ADAPTER FOR SAME
Filed Dec. 6, 1935
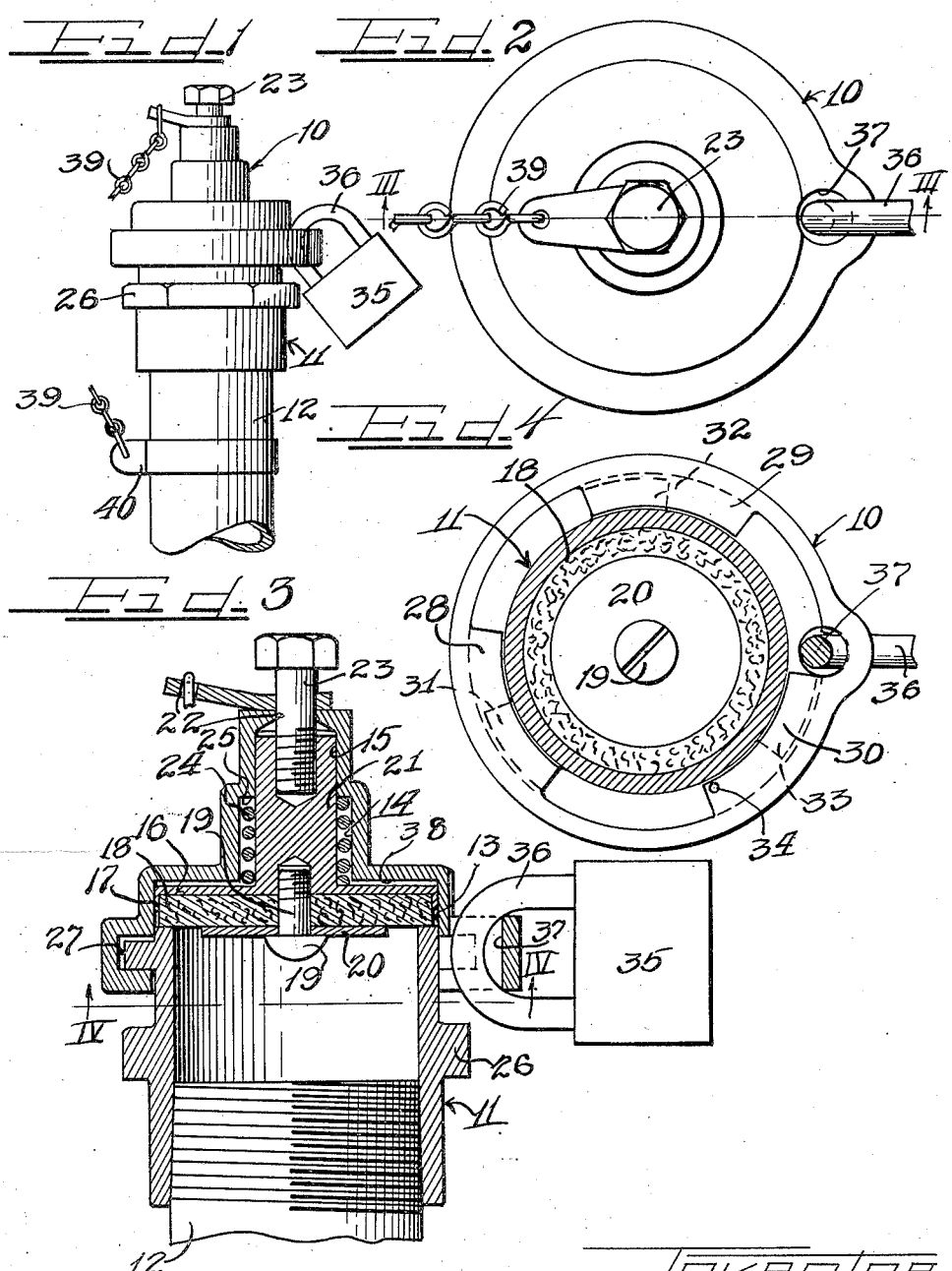

Patented May 17, 1938

2,117,473

UNITED STATES PATENT OFFICE 2,117,473

CAP AND ADAPTER FOR SAME

William N. Glab, Dubuque, Iowa, assignor to Morrison Brothers Company, Dubuque, Iowa, a corporation of Iowa Application December 6, 1935, Serial No. 53,149

1 Claim. (Cl. 220—44)

The present invention is primarily concerned with an improved cap and adapter for the same, which is particularly useful as a dust cap in connection with truck tank delivery faucets and fill pipes for underground storage tanks and the like such as are utilized in connection with the handling of hydrocarbon and other fluids.

In the caps heretofore utilized for this purpose, the caps have in general been arranged either for threaded securement or were hingedly mounted for movement into operative and inoperative positions. Both of these types included some form of gasket, usually of a fibrous material, which was fixedly secured to the caps.

This construction in the screw type of cap was objectionable in that when the cap was screwed into position, the movement of the gasket on its seating surface resulted in the gasket becoming worn, which necessitated frequent replacement thereof. Moreover, when the screw cap was screwed down tightly enough to form an effective seal or closure it was necessary to use a tool, such as a wrench or the like, to remove the cap.

Since a proper tool was not always available when needed, the attaching and detaching of the caps of this construction was usually accompanied by considerable inconvenience and loss of time. In the hinge type, it was difficult to get a good seal unless some sort of clamping means were used, thus resulting in a more or less complicated cap.

With the foregoing objections in mind, the present invention contemplates a cap and adapter of novel construction, which may easily and quickly be connected and disconnected by hand without the necessity of additional tools.

A further object is to provide a cap having novel securing means permitting the cap to be pressed onto its adapter and, when so pressed, twisted or turned relative thereto to secure the cap against removal.

A further object is to provide in a cap of the foregoing type, a spring pressed valve which is free to turn relative to the cap during its connection and disconnection to its associated adapter, whereby unnecessary wear of the valve seating surface during the connecting and disconnecting operations is avoided.

It is also an object to provide a valve cap which will close or seal the end of a cooperatively associated tubular adapter on a pipe or other conductor, and which will also function as an emergency relief valve in case a high pressure should exist for any reason in the conductor.

Still another object is to provide an improved cap of the herein-described type which is less costly to manufacture, is more efficient in operation, and may be easily and quickly attached and detached.

In accordance with the general features of the present invention, it is proposed to provide a tubular adapter which may be threaded or otherwise secured to a pipe or faucet, and a removable cap, this cap and adapter having a tongue and groove connection to permit the cap to be easily connected and disconnected relative to the adapter. The cap is provided with a spring pressed valve which is adapted to be yieldingly pressed against the end of the tubular adapter to form a seal or closure. Moreover, since the valve in normal connected position of the cap is spring pressed, the valve also serves the additional purpose of an emergency relief in case the pressure within the tank or other container which communicates with the adapter reaches a high or undesirable value.

An additional feature of the invention resides in the utilization of the valve spring for causing relative axial movement in opposite directions between the cap and adapter, whereby the tongue and sides of the groove are moved into frictional engagement, thereby maintaining the cap and adapter against easy relative rotational movement, but which will, when the cap is pressed toward the adapter, disengage the tongue and side of the groove so that the cap may be easily twisted to the position permitting its removal from the adapter. Simple means for locking the cap to the adapter is provided by making an opening in the cap which is adapted to receive the hasp of an ordinary padlock, this hasp when inserted in the opening being disposed in the path of travel of the tongue of the tongue and groove connection, thus preventing movement of the cap to released position relative to the adapter.

Other objects and features of the invention will more fully appear from the following detailed description, taken in connection with the accompanying drawing, which illustrates a preferred embodiment thereof and in which:

Figure 1 is a view in elevation showing the cap of the present invention locked in operative position to an adapter on the end of a conduit;

Figure 2 is a plan view of the same;

Figure 3 is an enlarged vertical sectional view through the cap and adapter, taken substantially on line III—III, of Figure 2; and Figure 4 is a horizontal sectional view through the adapter with the cap secured thereto, taken substantially on line IV—IV of Figure 3.

As shown on the drawing:

On the drawing there is shown in Figure 1 a cap generally indicated at 10, which is connected to an adapter 11, the adapter being secured to the end of a pipe 12. Although the cap and adapter are shown in connection with a pipe or conduit, which might be the fill pipe of a storage tank, it will be appreciated that this cap and adapter might with equal facility be used in connection with a faucet such as utilized in connection with tank trucks for handling hydrocarbon or other fluids.

As shown in Figure 3, it will be observed that the cap is of circular shell structure so formed as to provide axially aligned interior portions 13, 14 and 15 of circular cross section and progressively decreasing diameter.

The portion 13 forms a housing for a circular valve member 16 which is deflected at its outer margin to form an annular flange 17 which forms a cup shaped surface for receiving a valve gasket 18 of suitable material such as leather. The gasket is secured in position by means of a screw or bolt 19 which extends through a metallic abutment washer 20 and is threaded into a central upwardly extending guide stem 21.

This stem 21 is reciprocably mounted in the portion 15 of the cap and is free to permit relative rotational movement of the stem and valve relative to the shell of the cap.

The outer end of the portion 15 is provided with a centrally disposed opening 22 for receiving a bolt 23. The head of this bolt is disposed externally of the cap shell and the opposite end of the bolt is threaded into the outer end of the stem 21.

The portion 14 which is intermediately disposed between the portions 13 and 15, cooperates with the outer surface of the stem 21 to form an annular chamber in which there is disposed an expansible spring 24. One end of this spring bears against the member 16 and the other end bears against a shoulder 25 at the juncture of the portions 14 and 15. This spring acts to move the valve disc downwardly until the head of the bolt 23 is limited in its movement by the outer end of the cap.

The cap as thus constructed forms a female member which is adapted to receive an end of the tubular adapter 11, the inserted end of the male adapter being arranged to engage the lower surface of the gasket 18 and depress the valve member against the action of spring 24.

The other end of the adapter is internally threaded for attaching to the conductor 12. Intermediate of the ends, this adapter is provided with an outwardly projecting portion 26 which is polygonal to permit the application of a wrench or other tool thereto for tightening the adapter on the pipe.

The open end of the portion 13 of the cap is deflected to define a circumferentially extending groove 27. As shown in Figure 4, the outer wall of the groove 27 is cut out to define spaced inwardly projecting tongues 28, 29 and 30. The cutout portions between these tongues provide entrance openings for permitting projecting tongues 31, 32 and 33 to pass into the groove 27 when the cap is inserted over the adapter. By twisting or rotating the cap relative to the adapter, the tongues 31, 32 and 33 on the adapter will move along the groove 27 until they are overlapped by the tongues 28, 29 and 30 formed by the outer wall of the groove 27, thereby retaining the cap against removal from the adapter.

In order to limit the rotative movement of the cap relative to the adapter, a stop pin 34 is mounted so as to extend across the groove in the path of travel of one of the tongues on the adapter.

The cap is locked against removal from the adapter by means of an ordinary padlock such as shown at 35. The hasp 36 of this lock may be inserted through an opening 37 in the cap which extends through the groove 27. It will be observed that when the lock hasp is in the opening 37, movement of the cap is prevented in one direction by the engagement of the stop pin 34 with one of the tongues on the adapter, while movement in the opposite direction would be prevented by engagement of the padlock hasp with one of the tongues, thereby preventing movement of the cap to such position that the tongues of the adapter may be withdrawn through cutout portions separating the tongues on the cap.

When the cap is in connected position on the adapter, it will be observed that the spring 24 will cause the valve member to forcibly engage the inserted end of the adapter, thereby forming a closure or seal. In this position, the spring 24 also operates to tend to push the cap upwardly so that the tongues 28, 29 and 30 will be forced against the tongues 31, 32 and 33. This frictional engagement of the tongues prevents the cap from being jarred or otherwise easily rotated to such position that it would be released from the adapter. To remove the cap, pressure would be applied against the top of the cap so as to push the cap downwardly against the pressure of the spring 24, this movement releasing the frictional engagement between the tongues and permitting the cap to be easily turned to a position where it may be withdrawn from the adapter.

It should also be noted that when the cap is connected to the adapter there is a definite clearance between the upper surface of the valve member 16 and a shoulder 38 at the junction of portions 13 and 14. With this clearance, it will be evident that should the pressure acting on the other side of the valve reach a dangerous value, the valve may move up against the pressure of the spring 24, thereby relieving the pressure in the adapter, pipe 12 or other conductor to which the adapter may be connected, and the container in communication with pipe 12. It will therefore be appreciated that the cap of this invention not only serves as a closure means but also forms an emergency relief valve.

Removal of the cap to a remote location relative to the adapter is prevented by a short length of chain 39 which is anchored at one end as by clamp or other means 40 to the pipe 12, and at the other end is swivelly connected to the shank of the bolt 23.

From the foregoing description, it will be apparent that the present invention provides an improved cap and adapter of novel construction, which may easily and quickly be connected and disconnected by hand without the necessity of additional tools; which contains a valve for cooperating with the end of the adapter to form a closure or seal, this valve being mounted for axial as well as rotational movement relative to the cap; and in which the valve not only serves as a closure or seal but also is operative as an emergency relief valve for relief of excessive pressures within the receiver to which the cap and adapter are connected.

I claim as my invention:

In combination, a female cap member having a centrally disposed portion defining an upwardly extending socket having an opening at its upper end, a valve in said cap having a reciprocable stem disposed in said socket, a bolt extending through said opening and threadedly engaging the end of the stem in said socket, a compression spring tending to move said valve away from the socket, the engagement of the head of said bolt with the adjacent portion of the cap operating to limit said valve movement, a tubular male member insertable into the female cap member and engageable with said valve, whereby the valve is moved against said spring and the inserted end of the male member closed by the valve, and means for securing the male and female members in cooperative association.

WILLIAM N. GLAB.